United States Patent
Vande Ryse et al.

(10) Patent No.: US 9,392,748 B2
(45) Date of Patent: Jul. 19, 2016

(54) PLUNGER FOR SQUARE BALER

(71) Applicant: CNH Industrial America LLC, New Holland, PA (US)

(72) Inventors: Yannic Vande Ryse, Bruges (BE); Johan A. E. Vande Ryse, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/754,171

(22) Filed: Jun. 29, 2015

(65) Prior Publication Data

US 2016/0000010 A1   Jan. 7, 2016

(30) Foreign Application Priority Data

Jul. 3, 2014   (BE) .................................. 2014/0509

(51) Int. Cl.
- *A01F 15/04* (2006.01)
- *A01F 15/10* (2006.01)
- *B30B 9/30* (2006.01)

(52) U.S. Cl.
CPC ............. *A01F 15/042* (2013.01); *A01F 15/101* (2013.01); *B30B 9/3021* (2013.01); *A01F 2015/102* (2013.01)

(58) Field of Classification Search
CPC ..... A01F 15/042; A01F 15/101; A01F 15/10; A01F 2015/102; B30B 9/3021; B30B 9/3032
USPC ............. 100/178, 179, 188 R, 189, 240, 245, 100/255, 295; 56/341
See application file for complete search history.

(56) References Cited

U.S. PATENT DOCUMENTS

| | | | | |
|---|---|---|---|---|
| 3,039,383 | A | * | 6/1962 | Windle ................. B30B 9/3096 100/100 |
| 4,569,282 | A | * | 2/1986 | Galant .................... A01F 15/04 100/189 |
| 4,825,760 | A | * | 5/1989 | Weddeling ............ A01F 15/101 100/188 R |
| 4,829,756 | A | | 5/1989 | Schrag et al. |
| 5,090,307 | A | * | 2/1992 | Lippens ............... A01B 61/025 100/142 |
| 8,069,781 | B2 | | 12/2011 | Lang |
| 2013/0047867 | A1 | | 2/2013 | Van De Laarschot et al. |

FOREIGN PATENT DOCUMENTS

| | | |
|---|---|---|
| DE | 384153 C | 11/1923 |
| DE | 202009007734 U1 | 8/2009 |
| FR | 2143033 A1 | 2/1973 |
| SU | 954255 A1 | 8/1982 |
| WO | 2015014626 A1 | 2/2015 |

* cited by examiner

*Primary Examiner* — Jimmy T Nguyen
(74) *Attorney, Agent, or Firm* — Patrick M. Sheldrake

(57) ABSTRACT

A baler having a reciprocating plunger within a main bale chamber for compressing crop material into bales. The plunger has a first guide mechanism for permitting linear movement within the main bale chamber that allows a pivoting of an end face. A second guide mechanism includes a slot allowing the plunger to be oriented so that the second edge of the end face compresses crop material first and then subsequently pivots to compress equally and finally to have the second edge leading the first edge of the end face away from the bale to provide greater bale compression without additional force.

8 Claims, 4 Drawing Sheets

PLUNGER FOR SQUARE BALER

BACKGROUND OF THE INVENTION

This application claims foreign priority under 35 U.S.C. §119 to Belgian Application BE2014/0509 filed Jul. 3, 2014 titled "PLUNGER FOR SQUARE BALER" and having Yannic Vande Ryse and Johan A. E. Vande Ryse as the inventors. The full disclosure of BE2014/0509 is hereby incorporated herein by reference.

1. Field of the Invention

The present invention relates to agricultural balers and more specifically for plungers used in such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes sniffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger first slot 82 formed in the side walls of the bale chamber, with the plunger first slot 82 guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

One of the desirable outcomes in forming a bale is to have a bale with greater density of crop material. This is achieved by increasing the resistive force as the plunger compresses crop material within the main bale chamber. However, in so doing, the forces reacting on the plunger and the mechanism for reciprocating the plunger begin to increase which is not desirable for long-term operation.

US20110/0107588 describes a baler having a plunger with a pivoting point, where the pivoting point travels in the guiding channel. A linkage is provided between the plunger and a rotating drive element such that the plunger is moved forward and backwards in the guiding channel. The plunger has a face configured to have a line of loading. This line of loading shifts across the face as the linkage drives the plunger forwards and backwards in the guiding channel. The linkage directly drives the plunger without an intervening pivoting linking member, as is the case in most prior art balers. However, the line of loading from this plunger is such that first, the lower part of the newly fed crop material is compressed, and in a second phase the upper part since the rocking of the plunger starts below and moves in an upward rotation.

While others have proposed complex balers and mechanisms to reduce force applied to the plunger, they suffer from complicated mechanisms and the inevitable additional cost in an attempt to achieve such a goal.

What is needed in the art therefore, is a simplified and effective way to minimize reaction forces on a plunger while increasing bale density.

SUMMARY OF THE INVENTION

The present invention provides increasing bale density without significantly increasing the reactive forces on a plunger.

The invention, in one form, is directed to a baler including a main bale chamber having upper, lower and side walls with the main bale chamber having an outlet for discharge of compressed crop material into bales. A plunger is reciprocated within the main bale chamber between a first position away from the outlet and a second position towards the outlet, the plunger having an end face with first and second edges for compressing crop material in the main bale chamber. A mechanism reciprocates the plunger within the main bale chamber between the first and second positions. An opening in one of the side walls has a front edge and is positioned to permit entry of crop material into the main bale chamber when the plunger is in the first position, the first edge of the plunger end face sweeping over the opening when the plunger is translated between the first and second positions. The invention is characterized by a first guide mechanism for translation of the plunger between the first and second positions, the first guide mechanism permitting pivoting of the plunger about an axis substantially parallel to the front edge of the opening. A second guide mechanism is connected between at least one of the main bale chamber walls and the plunger the first and second mechanisms cooperating to place the plunger in the first orientation so that the second edge of the plunger end face compresses crop material first when the plunger is in the first position and in between the second plunger position orients the plunger end face so that both edges compress the crop material equally, the second guide mechanism providing a predetermined translation from the first to the second orientation.

An advantage of the present invention is that the bale density is increased while the reactive loads on the plunger are not increased which facilitates compression of bales and reciprocation of the plunger.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
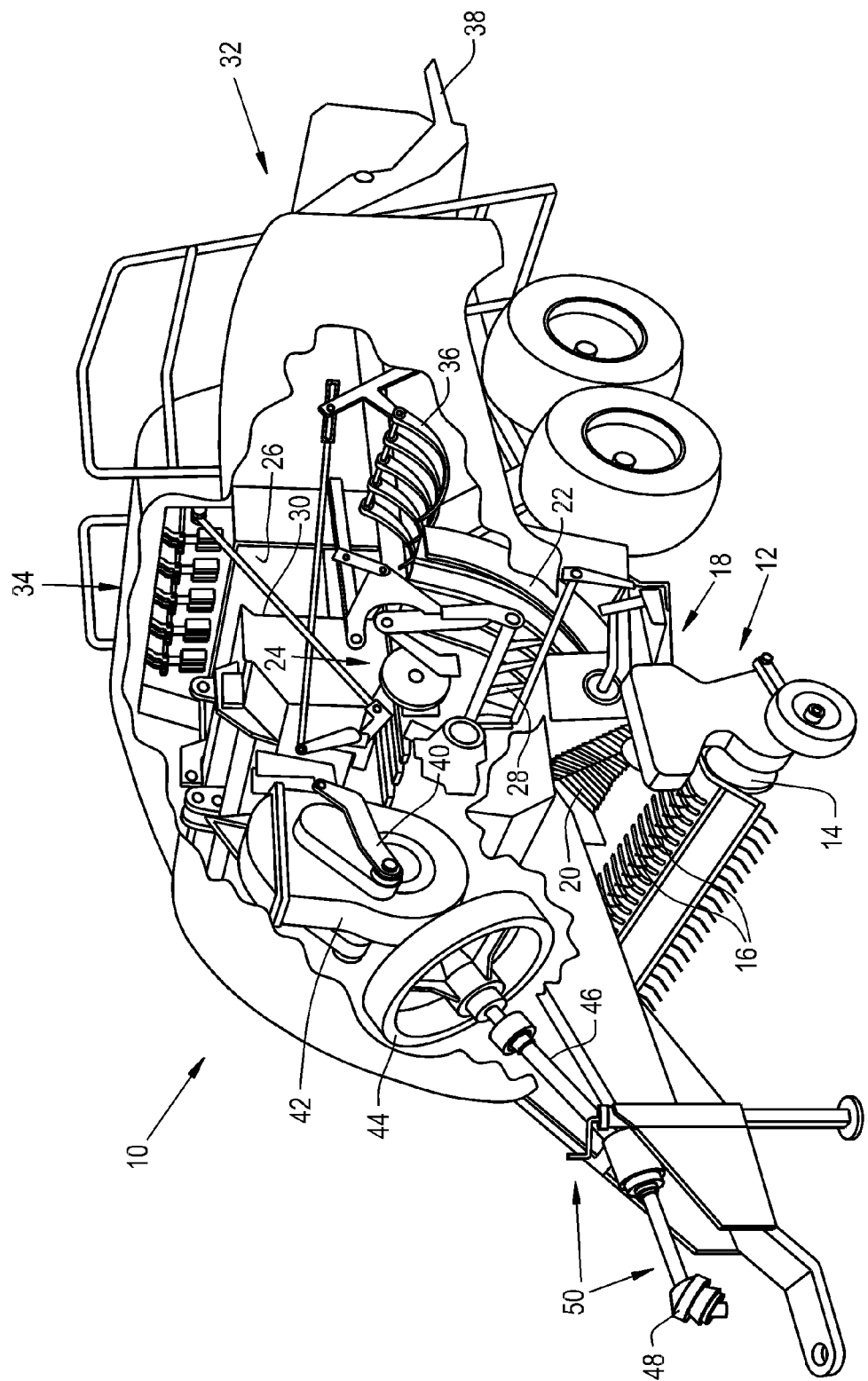
FIG. 1 is a perspective cutaway view showing the internal workings of a large square baler, which may include a plunger of the present invention.

Referring now to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

Figure 2:
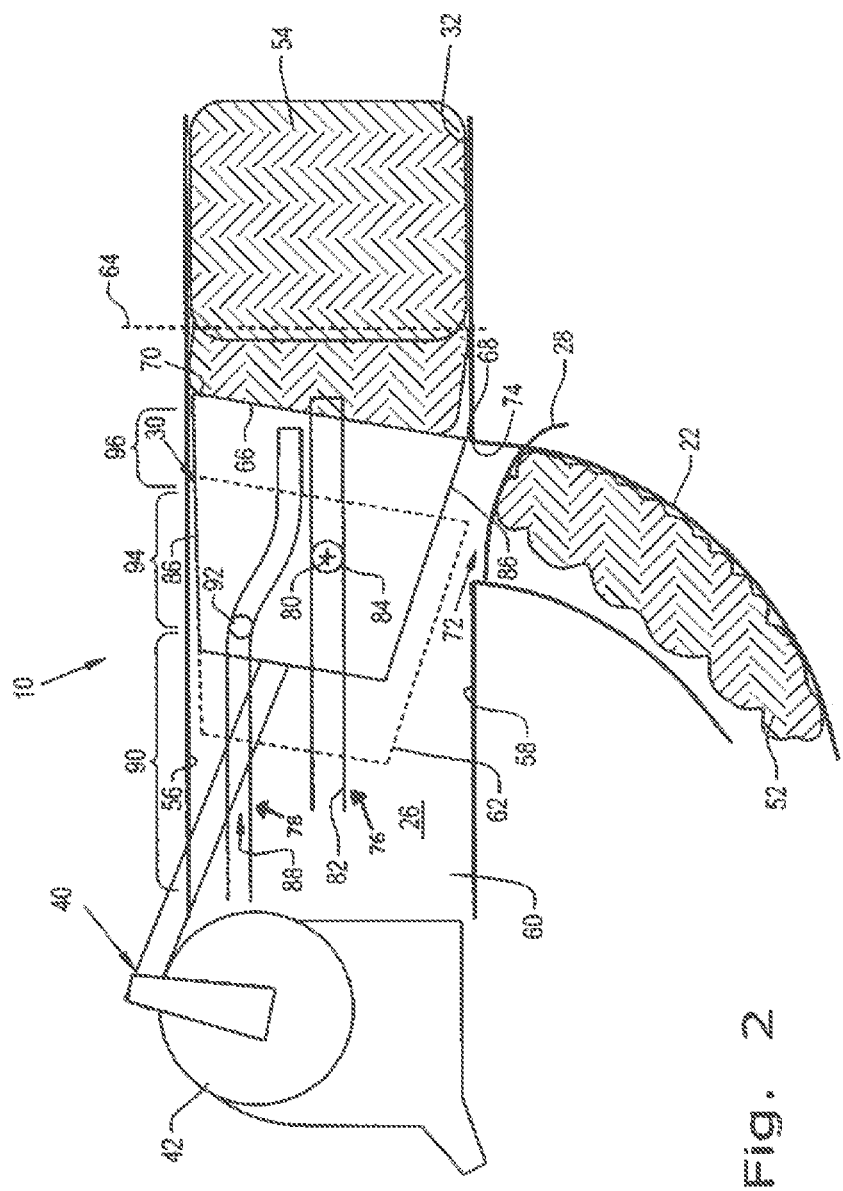
FIG. 2 is a schematic side view of a plunger incorporating the present invention (shown in a first position) that may be used in the baler of FIG. 1.
Figure 3:
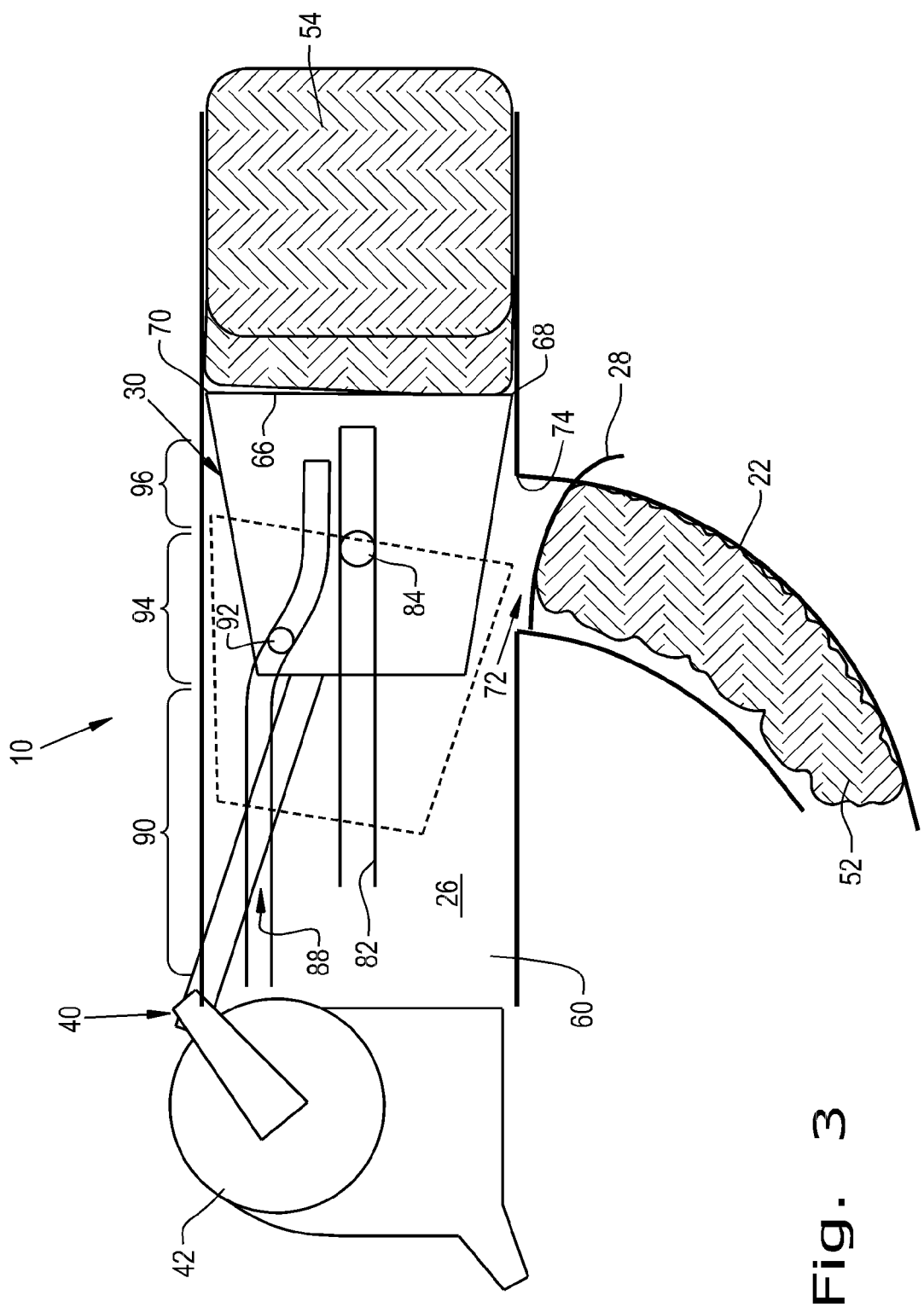
FIG. 3 is a schematic side view of the plunger of FIG. 2, shown in a second position.

Referring now to FIG. 2, there is shown, in schematic fashion, the baler 10 having the main bale chamber 26 in which the plunger 30 reciprocates to form crop material 52 into a completed bale 52. The crank arm 40 causes the plunger 30 to reciprocate and move along upper and lower walls 56, 58 respectively and sidewalls 60 towards the outlet 32 through which the bales 54 are ejected. The plunger 30 is reciprocated between a first position 62 shown in dashed lines in FIG. 2 and a second position 64 shown in a dashed vertical line. Plunger 30 has an end face 66 with a first edge 68 and a second edge 70. The first edge 68 sweeps over a crop opening 72 as the plunger 30 is reciprocated within main bale chamber 26. Crop opening 72 has a front edge 74 which is generally at a right angle with respect to the longitudinal axis of main bale chamber 26.

As plunger 30 is reciprocated within main bale chamber 26, it is acted on by a first guide mechanism 76 and a second guide mechanism 78. The crank arm 40 reciprocating the plunger 30 is pivotally connected to plunger 30 at a pivotal connection 80. The first guide mechanism 76 includes a first slot 82 in side wall 60. First slot 82 is straight and is generally parallel to the longitudinal axis of main bale chamber 26. A roller 84 is received in the slots 82 on both side walls 60 so as to maintain the plunger within the main bale chamber 26 but at the same time permit limited pivoting of the plunger 30. Tapered upper and lower walls 86 on plunger 30 provide clearance for the limited pivoting of the plunger.

The second guide mechanism 78 includes a second slot 88 in the sidewalls 60. Second slot 88 has a first section 90 which is parallel to first slot 82 and spaced at a distance from first slot 82 so that a roller 92 on plunger 30 causes the orientation of end face 66 as shown in FIG. 1. Second slot 88 has a second section 94 in which a predetermined transition of roller relative to first slot 82 takes place. The second slot 88 has a third section 96 in which the section is substantially parallel to first slot 82 but brings the roller 92 closer to first slot 82.

The pre-compression chamber 22 sequentially introduces the crop material 52 through opening 72 into main bale chamber 26 by stuffer forks 28. In operation, the reciprocating mechanism continuously reciprocates plunger 30 between first position 62 and the second position 64. This movement of the plunger 30 is synchronized with the entry of crop material 52 to produce the flakes that ultimately make up the completed bale 54. The plunger 30 is guided into one of three orientations relative to main bale chamber 26 as the plunger 30 is reciprocated. These orientations are set by the second guide mechanism 78. As shown in FIG. 2, the roller is in the first section 90 where the plunger 30 is at or near its first position 62. In this section, the end face 66 is oriented so that the first edge 68 of the end face 66 sweeps across the front edge 74 of crop opening 72 and the second edge 70 leads the first edge 68 and compresses crop material first.

Figure 4:
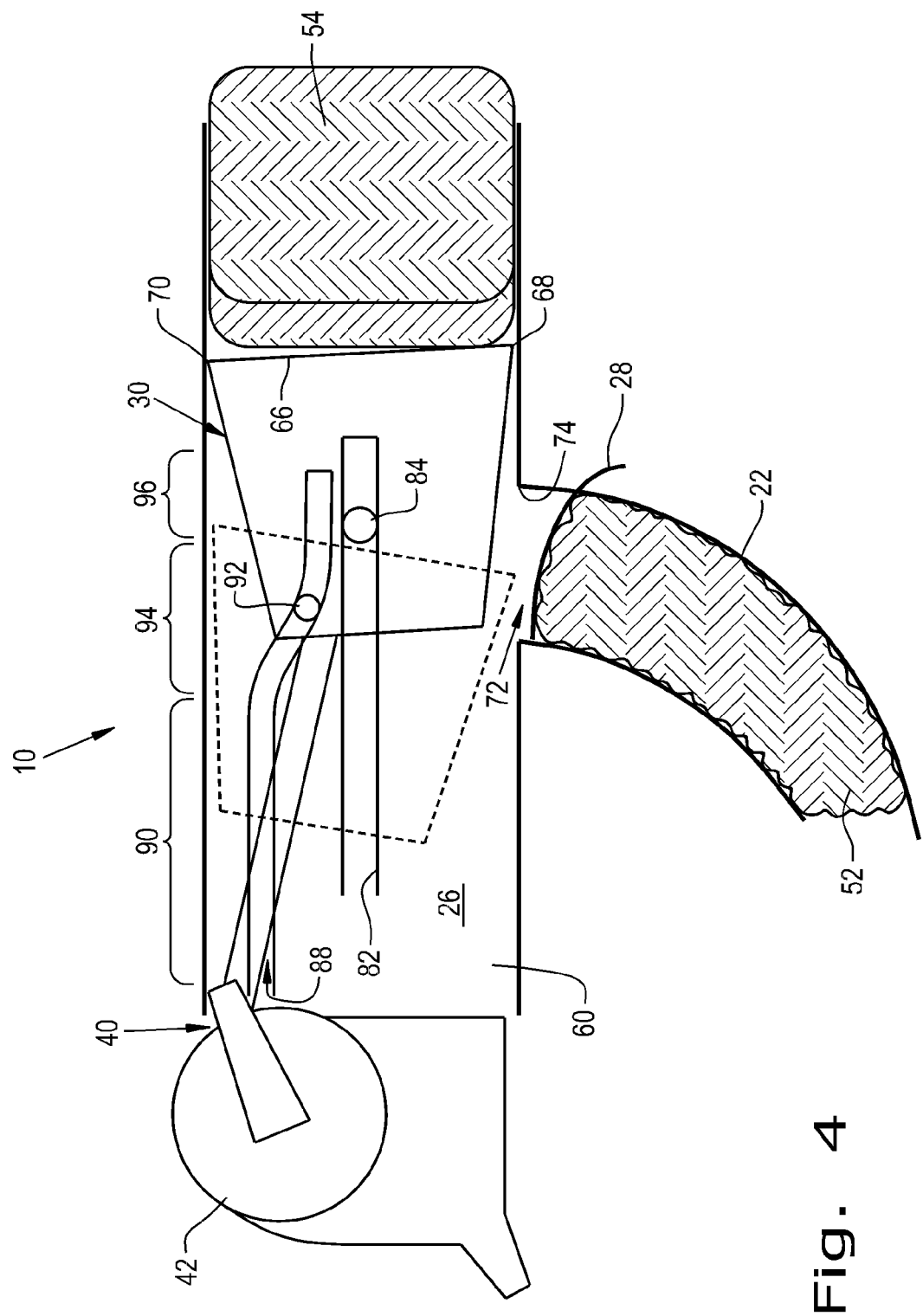
FIG. 4 is a schematic side view of the plunger of FIG. 2, shown in a third position.

As the plunger 30 continues its movement, it passes into the orientation of FIG. 2 set by section 94 of second slot 88. In this position, the edges 68 and 70 of the end face 66 press equally on the crop material. As the plunger 30 continues its movement towards its second position 64, it assumes the orientation shown in FIG. 4 where the first edge 68 of end face 66 is closer to the second plunger position 64 than the second edge 70. This facilitates movement of the plunger 30 and completed bale 52 as the plunger 30 returns to its first position 62.

The mechanism described above enables a significantly increased bale density without significant additional reactive forces on the plunger 30. This is done with a mechanism that is greatly simplified and economical. The provision of the slot for the second guide mechanism 78 enables the orientation of end face 66 to be flexibly and in a predetermined manner moved from the first orientation of the first position 62 to the second orientation as the plunger 30 moves toward its second position 64. This allows the plunger orientation to be controlled for particular desired applications. Although the first guide mechanism 76 is shown with a straight line movement and the second guide mechanism 78 is shown with straight and curved movement, the contours of both may be arranged to produce the desired orientation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A baler comprising:
   a main bale chamber having upper, lower and side walls, said main bale chamber having an outlet for discharge of compressed crop material into bales;
   a plunger reciprocable within said main bale chamber between a first position away from said outlet and a second position towards said outlet, said plunger having an end face with a lower and a upper edge for compressing crop material in said main bale chamber;
   a mechanism for reciprocating said plunger within said main bale chamber between said first and second positions;
   an opening in one of said walls having a front edge and positioned to permit entry of crop material into said main bale chamber when said plunger is in said first position, the lower edge of said plunger end face sweeping over said opening when said plunger is translated between said first and second positions;
   a first guide mechanism for translation of said plunger between said first and second positions, said first guide mechanism permitting pivoting of said plunger about an axis substantially parallel to the front edge of said opening; and
   a second guide mechanism connected between at least one of said main bale chamber walls and said plunger, said first and second guide mechanisms cooperating to place said plunger in a first tilted orientation so that the upper edge of said plunger end face compresses crop material first when said plunger is in said first position and as the plunger moves toward said second position, said first and second guide mechanisms further orient the plunger end face to a second orientation so that both of the upper and lower edges compress the crop material equally, said second guide mechanism providing a predetermined translation from said first to said second orientation, wherein in the first orientation the upper edge of said plunger end face is closer to said second position than the lower edge of said plunger end face.

2. The baler of claim 1, wherein said reciprocating mechanism comprises a crank arm rotatable and pivotally connected to said plunger.

3. The baler of claim 1, in which the first guide mechanism comprises a first slot on a wall and a first roller on said plunger.

4. The baler of claim 3, in which the second guide mechanism comprises a second slot in one of said walls and a second roller on said plunger spaced from said first roller.

5. The baler of claim 4, in which the second slot has a first section parallel to and spaced from the first slot and a second section in which the second slot converges on the first slot to define the second orientation of said plunger end face.

6. The baler of claim 5, in which the second slot comprises a third section extending from said second section and extending parallel to said first slot to orient the end face so that the first edge trails the top edge of said end face as said plunger moves away from said second position.

7. The baler of claim 1, in which said opening is on the lower wall and the guide mechanisms are connected to at least one side wall.

8. The baler of claim 7, in which the guide mechanisms are connected to both side walls.

* * * * *